United States Patent
Sollee et al.

(10) Patent No.: US 6,934,279 B1
(45) Date of Patent: Aug. 23, 2005

(54) CONTROLLING VOICE COMMUNICATIONS OVER A DATA NETWORK

(75) Inventors: Patrick N. Sollee, Richardson, TX (US); David R. Creech, Carrollton, TX (US); Gregory T. Osterhout, Coppell, TX (US); Christopher L. Jessen, McKinney, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/524,342

(22) Filed: Mar. 13, 2000

(51) Int. Cl.⁷ .............................................. H04L 12/56
(52) U.S. Cl. ...................................... 370/352; 370/356
(58) Field of Search ................................. 370/352, 465, 370/467, 356, 260; 379/230, 15.01; 709/223

(56) References Cited

U.S. PATENT DOCUMENTS

| | | | |
|---|---|---|---|
| 4,706,242 A | | 11/1987 | Harland ........................ 370/60 |
| 6,084,956 A | * | 7/2000 | Turner et al. ................ 370/467 |
| 6,091,808 A | | 7/2000 | Wood et al. .................. 379/201 |
| 6,185,565 B1 | | 2/2001 | Meubus et al. ............... 707/10 |
| 6,192,050 B1 | | 2/2001 | Stovall ......................... 370/389 |
| 6,337,858 B1 | * | 1/2002 | Petty et al. ................... 370/356 |
| 6,363,065 B1 | * | 3/2002 | Thornton et al. ............ 370/352 |
| 6,404,774 B1 | * | 6/2002 | Jenness ........................ 370/465 |
| 6,421,424 B1 | * | 7/2002 | Creamer et al. ........... 379/15.01 |
| 6,430,282 B1 | | 8/2002 | Bannister et al. ....... 379/211.02 |
| 6,526,129 B1 | | 2/2003 | Beaton et al. ............ 379/90.01 |
| 6,549,621 B1 | * | 4/2003 | Christie et al. .............. 379/230 |
| 6,570,870 B1 | * | 5/2003 | Berstis ......................... 370/356 |
| 6,614,899 B1 | | 9/2003 | Sollee et al. ............. 379/218.01 |
| 6,671,262 B1 | * | 12/2003 | Kung et al. .................. 370/260 |
| 6,687,747 B1 | * | 2/2004 | Huang et al. ................ 709/223 |

FOREIGN PATENT DOCUMENTS

| | | |
|---|---|---|
| EP | 0 721 266 A2 | 7/1996 |
| EP | 0 829 995 A2 | 3/1998 |
| EP | 0 836 295 A2 | 4/1998 |
| EP | 1109368 A2 * | 6/2001 ........... H04L/12/64 |
| WO | WO 99/05590 | 2/1999 |

OTHER PUBLICATIONS

Steve Donovan, et al., *The SIP Info Method*, Internet Draft, pp. 1–7 (Jun. 1999).
Steve Donovan, *The SIP Info Method*, Internet Draft, pp. 1–10 (Feb. 2000).
Jon Crowcroft, *Comments About H.323 and SIP*, pp. 1–6, printed from web site http://www.cs.columbia.edu (Jan. 22, 1998).
*Comparison of H.323 and SIP*, pp. 1–5, printed from web site http://www.cs.columbia.edu, dated at least as early as Feb. 3, 2000.
Information Sciences Institute, *Internet Protocol, Darpa Internet Program Protocol Specification, RFC 791*, pp. 1–48 (Sep. 1981).
J. Postel, *User Datagram Protocol, RFC 768*, pp. 1–3 (Aug. 1980).

(Continued)

Primary Examiner—Salvatore Cangialosi
(74) Attorney, Agent, or Firm—Trop, Pruner & Hu, P.C.

(57) ABSTRACT

A method and apparatus of communicating over a data network includes providing a user interface in a control system for call control and to display information relating to a call session. The control system communicates one or more control messages (e.g., Session Initiation Protocol or SIP messages) over the data network to establish a call session with a remote device in response to receipt of a request through the user interface. One or more commands are transmitted to a voice device associated with the control system to establish the call session between the voice device and the remote device over the data network. A Real-Time Protocol (RTP) link may be established between the voice device and the remote device.

39 Claims, 7 Drawing Sheets

OTHER PUBLICATIONS

M. Handley, et al., *SDP: Session Description Protocol*, RFC 2327, pp. 1–39 (Apr. 1998).

H. Schulzrinne, et al., *RTP: A Transport Protocol for Real-Time Applications*, RFC 1889, pp. 1–69 (Jan. 1996).

S. Deering, et al., *Internet Protocol, Version 6 (IPv6) Specification*, RFC 2460, pp. 1–36 (Dec. 1998).

M. Handley, et al., *SIP: Session Initiation Protocol*, RFC 2543, pp. 1–153 (Mar. 1999).

Adam Roach, *Event Notification in SIP*, Internet Draft, pp. 1–8 (Mar. 2000).

Scott Petrack, et al., *The Pint Service Protocol: Extensions to SIP and SDP for IP Access to Telephone Call Services*, Internet Draft, pp. 1–59 (Oct. 14, 1999).

Jiri Kuthan, *Sample Uses of SIP Info with Varying Reliability Needs*, Internet Draft, pp. 1–7 (Oct. 17, 1999).

Robert Sparks, et al., *SIP Telephony Service Examples with Call Flows*, Internet Draft, pp. 1–79 (Oct. 1999).

U.S. Appl. No. 09/307,356, *Telephony and Data Network Services at a Telephone*, pp. 1–113, Figures 1–6, filed May 7, 1999.

G.A. Thom, *H. 323: The Multimedia Communications Standard For Local Area Networks*, IEEE Communications Magazine, IEEE Service Center, N.J., vol. 34, No. 12, Dec. 1996, pp. 52–56.

* cited by examiner

CONTROLLING VOICE COMMUNICATIONS OVER A DATA NETWORK

BACKGROUND

The invention relates to controlling voice communications over a data network.

Data networks are widely used to link various types of network elements, such as personal computers, servers, gateways, network telephones, and so forth. Data networks may include private networks (such a local area networks or wide area networks) and public networks (such as the Internet). Popular forms of communications between network elements across such data networks include electronic mail, file transfer, web browsing, and other exchanges of digital data.

With the increased capacity and reliability of data networks, voice communications (including telephone calls, video conferencing, and so forth) over data networks have become possible. Voice communications over data networks are unlike voice communications in a conventional public switched telephone network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice data sent over a data network typically shares network bandwidth with conventional non-voice data (e.g., data associated with electronic mail, file transfer, web access, and other traffic).

Various standards have been proposed for voice and multimedia communications over data networks. One such standard is the H.323 Recommendation from the International Telecommunications Union (ITU), which describes terminals, equipment, and services for multimedia communications over data networks.

Another standard for voice and multimedia communications is the Session Initiation Protocol (SIP), which establishes, maintains, and terminates multimedia sessions over a data network. SIP is part of a multimedia data and control architecture developed by the Internet Engineering Task Force (IETF). The IETF multimedia data and control architecture also includes the Resource Reservation Protocol (RSVP) for reserving network resources; the Real-Time Transport Protocol (RTP) for transporting real-time data and providing quality of service (QoS) feedback; the Real-Time Streaming Protocol (RTSP) for controlling delivery of streaming media; the Session Announcement Protocol (SAP) for advertising multimedia sessions by multicast; and the Session Description Protocol (SDP) for describing multimedia sessions.

To perform voice communications over a data network, a typical computer system (such as a desktop computer system or a portable computer system) may be equipped with voice processing capabilities. Such capabilities include a microphone, ear phones or speakers, and speech processing software. Typically, the speech processing software includes coder/decoders (CODECs) to encode and decode voice data. The voice processing software, including the CODECs, may be run on a microprocessor of a typical computer system. However, due to the intensive data processing typically required to process voice data, speech performance may not be optimum. For example, there may be delays associated with the transfer of such voice data due to the amount of time needed to process the voice data. Also, if certain types of CODECs that have less resource requirements are selected, voice quality may suffer.

Also, the computer system needs to be fitted with speakers, microphones, and sound cards to enable speech processing. Further, such speakers, microphones, and sound cards may not provide the desired level of quality, or if they do, may be relatively expensive. Additionally, to add such speech processing components to a computer system may require some configuration to be performed by a user, a process that an unsophisticated user may have difficulty with.

Unless a computer system with powerful processing capabilities are provided, the voice quality provided by such computer systems are not at the level typically experienced (and expected) by users of standard telephones. Such "standard" telephones may include analog telephones coupled to a local or central switching office or digital telephones coupled to a private branch exchange (PBX) system. More recently, network telephones have been developed that are capable of being connected directly to a data network, such as an IP network. These network telephones are capable of placing telephony calls over a data network. The voice quality offered by such telephones are typically superior to those that can be offered by computer systems, since such network telephones typically include dedicated digital signal processors (DSPs) that perform the data intensive calculations involved in speech processing. However, the existing network telephones do not provide desired multimedia presentation capabilities such as those offered by displays of computer systems. Thus, while network telephones offer superior speech capabilities, it does have the desired multimedia capabilities. On the other hand, computer systems have superior multimedia capabilities, but they suffer from relatively poor speech processing performance.

A need thus exists for an improved method and apparatus for controlling voice communications over data networks.

SUMMARY

In general, according to one embodiment, a method of communicating over a data network includes communicating, in a control system, one or more control messages over the data network to establish a call session with a remote device coupled to the data network. One or more commands are transmitted to a voice device coupled to the data network. The call session between the voice device and the remote device is established over the data network. Information associated with the call session is displayed on the control system.

In general, according to another embodiment, a method of communicating over a data network includes providing a user interface in a control system for establishing call sessions. One or more control messages are communicated by the control system over the data network to establish a call session with a remote device in response to receipt of a request through the user interface. One or more commands are transmitted to a voice device associated with a control system to establish the call session between the voice device and the remote device over the data network.

Some embodiments of the invention may include one or more of the following advantages. The voice processing capabilities of a voice device, such as a network telephone, may be advantageously used to provide superior voice quality, while at the same time, a control system such as a computer may be used to provide a convenient user interface for the user to perform call control and to view status and other information relating to the call session. Thus, voice quality associated with call sessions over data networks such as packet-switched data networks is enhanced using embodiments of the invention.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to Session Initiation Protocol (SIP) communications sessions in accordance with some embodiments, other protocols may be performed in further embodiments.

Figure 1:
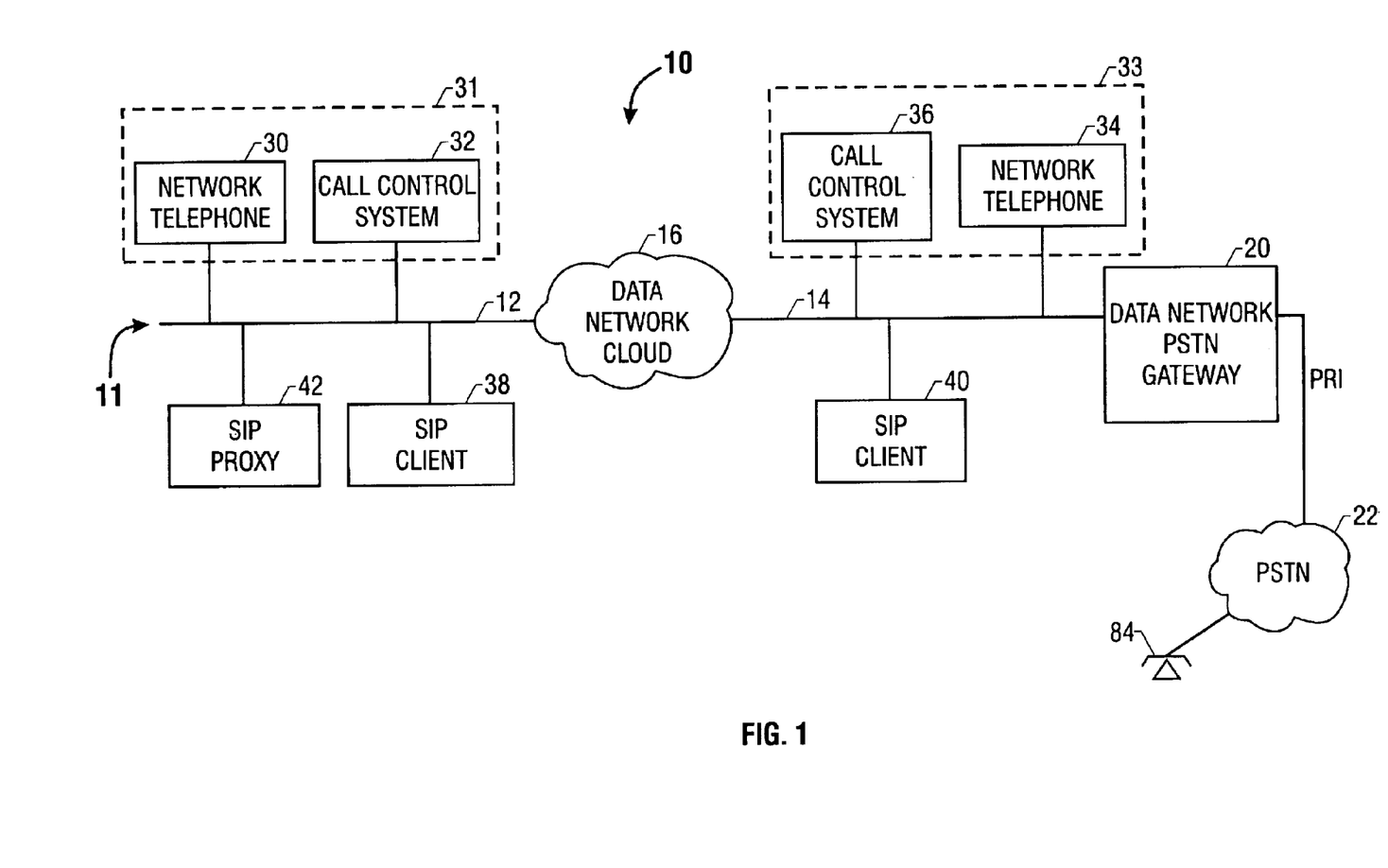
FIG. 1 is block diagram of an embodiment of a communications system.

Referring to FIG. 1, a communications system 10 includes a first data network 12 and a second data network 14 that are coupled through a data network cloud 16. The data network cloud 16 may include various links, communications paths, and routers for routing messages between data networks 12 and 14. The data network cloud 16 may include a public network such as the Internet. The data networks 12 and 14 may be private networks such as local area networks (LANs) or wide area networks (WANs). In the ensuing discussion, one or some combination of the data networks 12 and 14 and data network cloud 16 may be referred to collectively as the data network 11. As used here, a "data network" or "network" may refer to one or more communications networks, channels, links, or paths and systems (such as routers) used to route data over such networks, channels, links, or paths.

The data network 11 may include an Internet Protocol (IP) network, which is a packet-switched network. One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. Packet-switched data networks such as IP networks communicate with packets, datagrams or other units of data over the data networks. Unlike circuit-switched networks, which provide a dedicated end-to-end connection or physical path for the duration of a call session, a packet-switched network is one in which the same path may be shared by several network elements. Packet-switched networks such as IP networks are based on a connectionless internetwork layer. Packets or other units of data injected into a packet-switched data network may travel independently over any path (and possibly over different paths) to a destination point. The packets may even arrive out of order. Routing of the packets is based on one or more addresses carried in each packet.

The packet-based network 12 may also be connection-oriented, such as an ATM (Asynchronous Transfer Mode) network or a Frame Relay network. In a connection-oriented, packet-based network, a virtual circuit or connection is established between two end points. In such connection-oriented networks, packets are received in the same order in which they were transmitted.

Network elements connected to the data network 11 may also be coupled through a data network-PSTN gateway 20 to a public-switched telephone network (PSTN) 22. The link between the gateway 20 and the PSTN 22 may be a primary rate interface (PRI) link according to ISDN (Integrated Services Digital Network). Standard non-data network telephones 24 may be coupled to the PSTN 22. Call sessions can thus be established between a data network element and one of telephones 84.

In the example embodiment as illustrated in FIG. 1, audio (e.g., voice) and multimedia (e.g., audio and video) communications may occur over the data network 11 between or among various network elements, including network telephones 30 and 34 and call control systems 32 and 36. Other devices capable of voice or multimedia sessions include SIP (Session Initiation Protocol) client systems 38 and 40. The SIP client systems 38 and 40 are capable of communicating using SIP messaging to establish call sessions. As used here, a "call session" refers generally to either a voice or a multimedia session established between two or more elements coupled to the data network 11 (or any other packet-switched data network). SIP is part of the multimedia data and control architecture from the Internet Engineering Task Force (IETF). A version of SIP is described in RFC 2543, entitled "SIP: Session Initiation Protocol," dated August 1999. SIP may be used to initiate call sessions as well as to invite members to a session that may have been advertised by some other mechanism, such as electronic mail, news groups, web pages, and other mechanisms. The other protocols in the IETF multimedia and control architecture include the Resource Reservation Protocol (RSVP), as described in RFC 2205; the Real-Time Transport Protocol (RTP), as described in RFC 1889; the Real-Time Streaming Protocol (RTSP), as described in RFC 2326; the Session Description Protocol (SDP), as described in RFC 2327; and the Session Announcement Protocol (SAP).

Other standards may be employed in further embodiments for controlling call sessions over the data network 11. Such other standards may be any other standard that provides for interactive, real-time voice communications over the data network.

The SIP client systems 38 and 40 as shown in FIG. 1 include client application programs that are capable of sending SIP requests to perform call requests. The systems 38 and 40 may also be SIP servers. A server according to SIP may be an application program that accepts SIP requests to service calls and to send back responses to SIP requests. Thus, a system can be either a SIP client or a SIP server. A SIP proxy system, such as system 42, may include an intermediary program that acts as both a server and a client for making requests on behalf of other clients.

In the system 10 as shown in FIG. 1, the call control systems 32 and 36 are SIP-enabled; that is, the call control systems 32 and 36 are capable of sending and accepting SIP requests to establish call sessions. The call control systems 32 and 36 may be implemented on a standard computer system platform. Unlike the call control systems 32 and 36, however, the network telephones 30 and 34 are not SIP-enabled in one embodiment. Although they are capable of communicating audio data over the data network 11, the network telephones 30 and 34 are not enabled to send or accept SIP messages (or other types of messages for establishing interactive, real-time voice communications) to establish call sessions. In accordance with some embodiments, the establishment, management, and termination of call sessions are controlled by the call control systems 32 and 36. Thus, the call control system 32 makes SIP requests on behalf of the network telephone 30, while the call control system 36 makes SIP requests on behalf of the network telephone 34. Once a call session is established, the network telephone 30 or 34 participates in the communication of voice data over the network 11.

By employing the arrangement as shown in FIG. 1, the superior voice capabilities of network telephones 30 and 34 may be utilized to provide enhanced voice quality for users making telephony calls over the data network 11. At the same time, associated call control systems 32 and 36 are used to provide call signaling communications and to provide the user with a convenient user interface to perform call control as well as display information associated with the call session.

Figure 3:
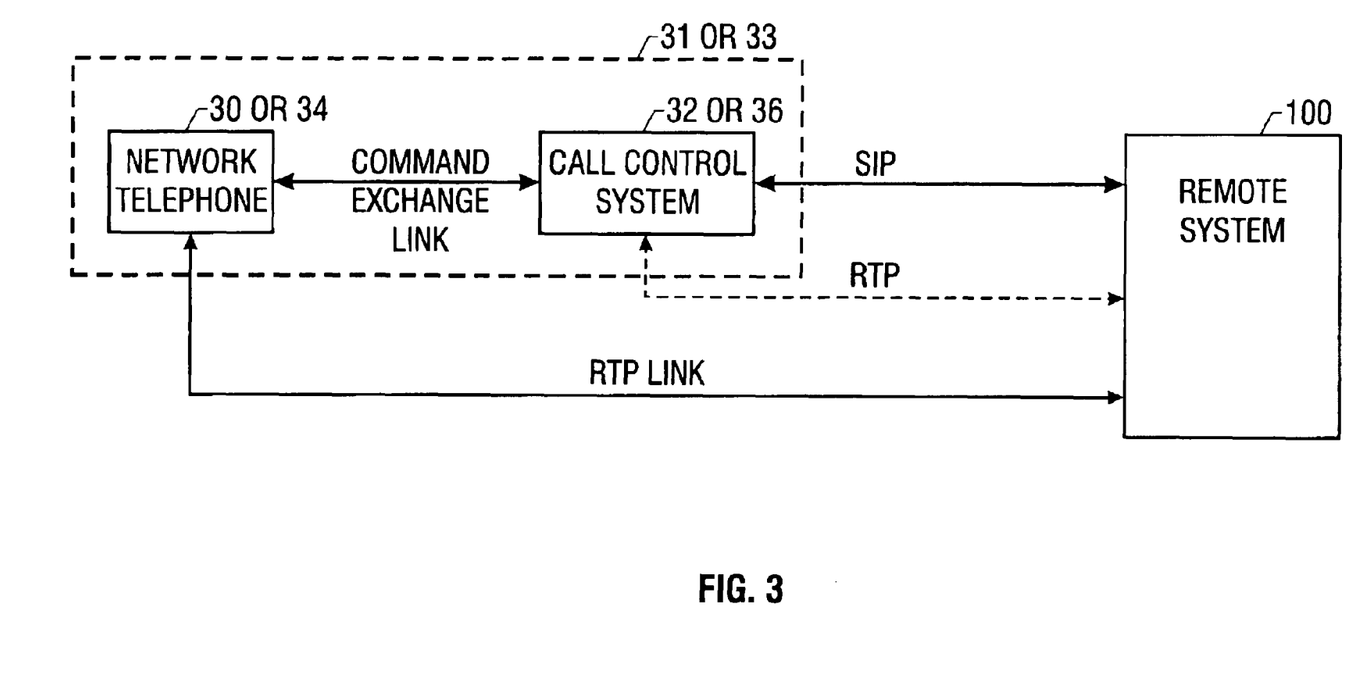
FIG. 3 illustrates control and data paths between network elements used during a call session in accordance with one embodiment.

The call control system 32 and the network telephone 30 may be collectively referred to as a telephony system 31. Similarly, the call control system 36 and network telephone 34 may be collectively referred to as a telephony system 33. To establish a call session between the telephony system 31 or 33 and another SIP-enabled remote system 100, as shown in FIG. 3, the call control system 32 or 36 sends SIP messages to the remote system 100 to establish a call session. The remote system 100 may be any system or device on the data network 11 that is capable of participating in a SIP-established call session. The call control system 32 or 36 also exchanges commands according to a predetermined format with the network telephone 30 or 34 to let the network telephone 30 or 34 know of the current status of the call setup. Once a call is established, a link may be established between the network telephone 30 or 34 and the remote system 100 over the data network 11. The link may be a Real-Time Protocol (RTP) link to communicate with voice data. Thus, in the telephony system 31 or 33, the call control system 32 or 36 communicates the control signaling to establish a call session, while a real-time link is established directly between the network telephone 30 or 34 and the remote system 100 for communicating voice or other types of audio data. In one embodiment, the call control messaging between the call control system and remote system, the control messaging between the call control system and the network telephone, and the call session between the network telephone and the remote system all occur over the data network 11.

The call control system 32 or 36 is also equipped with speech processing elements to allow it to communicate voice data with other devices on the data network 11. Thus, a user at the call control system 32 or 36 may select whether to use the call control system or the network telephone as the terminal device in the established call session. In addition, if the call control system 32 or 36 is powered off, the network telephone 30 or 34 may be used as a stand-alone device to communicate voice in call sessions over the data network 11.

Figure 2:
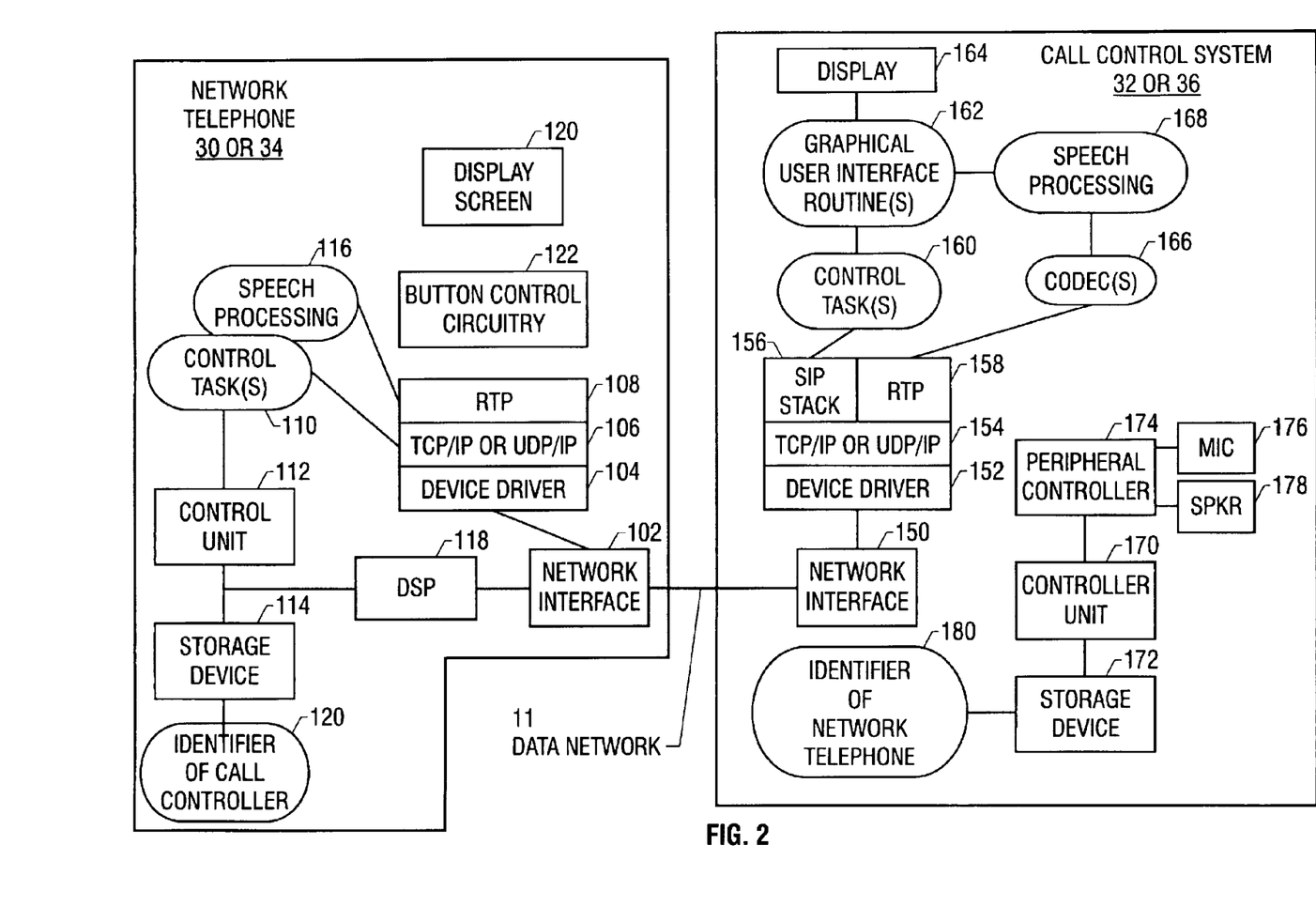
FIG. 2 illustrates components in a network telephone and a call control system in accordance with an embodiment.

Referring to FIG. 2, the components in the network telephone 30 or 34 and in the call control system 32 or 36 are illustrated in greater detail. The network telephone 30 or 34 includes a network interface 102 that is coupled to the data network 11. Above the network interface 102 are several software layers, including a device driver layer 104, a TCP/IP or UDP/IP stack 106, and an RTP layer 108. TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network. Packets received by the network interface 102 are passed up through the several layers 104, 106 and 108. Control packets are transmitted by the TCP/IP or UDP/IP stack 106 to one or more control tasks 110 in the network telephone 30 or 34. The one or more control tasks 110 may be implemented as software routines executable on a control unit 1112. Instructions and data associated with the control tasks 110 may be stored in a storage device 114. The control tasks 110 are responsible for generation of control signaling as well as exchanging commands and responses with its associated call control system 32 or 36 over the data network 11.

Voice data may be passed through the RTP layer 108 to a speech processing application 116, which may also be executable on the control unit 112. For faster processing of voice data, a digital signal processor (DSP) 118 is included in the network telephone 30 or 34 to provide data intensive signal processing tasks. For example, the coder/encoder (CODEC) may be implemented in the DSP 118. The network telephone may also include a display screen to display text data associated with a call session. The size of the display screen 120 may be limited so that only limited amounts of text data may be displayed in the display screen 120. The network telephone also includes numerals buttons that may be controlled by button control circuitry 122. The buttons may include numeric buttons, speed dial buttons, a transfer button, a hold button, a redial button, and other telephony buttons. Activation of any one of the buttons may cause generation of some type of an indication (such as an interrupt) that is forwarded to the control tasks 110.

The call control system 32 or 36 also includes a network interface 150. Above the network interface 150 are several layers, including a device driver layer 152, a TCP/IP or UDP/IP stack 154, a SIP stack 156, and an RTP layer 158. The SIP stack 156 is responsible for processing or generating SIP requests and responses communicated over the data network 11. The SIP stack 156 is in communication with one or more control tasks 160 in the call control system 32 or 36. The SIP stack 156 is generally a state machine that provides parsing, processing, and generation of SIP requests and responses.

The call control tasks 160 are responsible for generating control signaling to establish call sessions over the data network 11 as well as to respond to received control signaling. In addition, the control tasks 160 are responsible for exchanging commands and responses with the network telephone 30 or 34 to establish such call sessions. The call control system 32 or 36 may also include one or more graphical user interface (GUI) routines 162 that control the presentation of information (text or graphical) on a display 164 of the call control system. Further, the user interface provided by the GUI routines 162 may include selectors for call control and indicators of the status of a call session.

In the illustrated arrangement, the RTP layer 158 sends audio data to, or receives audio data from, a CODEC 166. The CODEC 166 encodes or decodes voice data. A speech processing routine 168 may perform further processing of voice data. In further embodiments, the audio CODEC 166 and the speech processing routine 118 may be omitted. The various software routines in the call control system 32 or 36, including the various layers 152, 154, 156, and 158 as well as the control tasks 160, CODECs 166, speech processing routine 168, and GUI routine 162, are executable on a control unit 170. The control unit 170 is coupled to a storage device 172 in which instructions and data associated with the various software routines may be stored.

In the illustrated example arrangement, to provide a voice or audio user interface to a user sitting at the call control system 32 or 36, a peripheral controller 174 is coupled to a microphone 176 and a speaker or head phone 178 through which a user can talk or listen during a call session. If the call control system 32 or 36 is not speech-enabled, the microphone 176 and speaker or head phone 178 may be omitted.

One call control system 32 or 36 may be associated with a corresponding network telephone 30 or 34. Thus, the network telephone 30 or 34 can identify which device is its controller. Similarly, a call control system 32 or 36 can identify the network telephone it is controlling. The network telephone 30 or 34 includes one or more fields 120 in the storage device 114 to store an identifier of its call controller, in this case the call control system 32 or 36. The identifier may be in the form of a network address and port number. For example, an IP address and a TCP or UDP port may form part of the identifier of the call controller 120. Similarly, the call control system 32 or 36 stores one or more fields 180 in the storage device 172 that stores the identifier of the network telephone it is controlling. Again, the identifier 180 may be in the form of a network address and port number, such as an IP address and a TCP or UDP port number. The identifier stored in the field 120 of the network telephone may be changed by a user to change the associated call control system. Similarly, the identifier stored in the field 180 of the call control system may be modified to change the controlled network telephone.

In further embodiments, one call control system may be associated with plural network telephones. Also, a single network telephone may be associated with plural call control systems.

The various control units in the network telephone 30 or 34, the call control 32 or 36, and any other system or device on the data network 11 may each include a microprocessor, a microcontroller, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various network elements may be stored in respective storage devices. The instructions when executed by a respective control unit cause the corresponding network element to perform programmed acts.

The instructions of the software routines, modules or layers may be loaded or transported to the network element in one of many different ways. For example, code segments including instructions stored on floppy disks, CD or DVD media, a hard disk, or transported through a network interface card, modem, or other interface device may be loaded into the system and executed as corresponding software routines, modules, or layers. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

Figure 4:
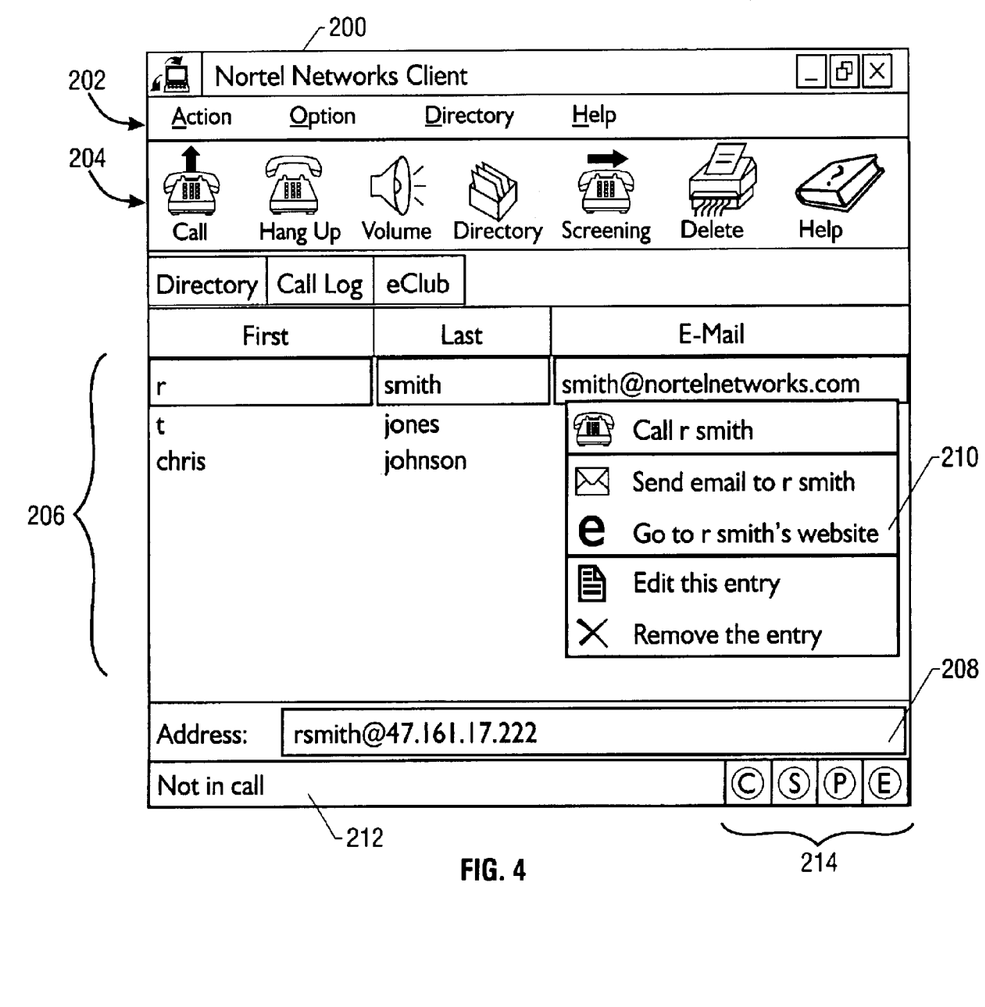
FIGS. 4 and 5 illustrate example screens displayed by the call control system of FIG. 2 in accordance with an embodiment.

Referring to FIG. 4, in accordance with one embodiment, a screen 200 that may be provided by the control tasks 160 and graphical user interface routines 162 in the call control system 32 or 36 is illustrated. The screen 200 as shown in FIG. 4 includes various icons and items (generally referred to as indicators) to allow a user sitting at the call control system to initiate, terminate, and screen calls over the data network 11. In the example shown in FIG. 4, the screen 200 includes a menu 202, a series of control buttons 204, and a list 206 of potential callees. The list 206 provides the first and last names of potential callees as well associated electronic mail addresses (or other information such as telephone numbers and so forth). As illustrated in FIG. 4, the name R. Smith may be highlighted in the list 206. The address of R. Smith is displayed in an address field 208. The address field 208 may include various formats, such as a PSTN number (e.g., 972-555-1234); a PSTN number and a proxy address (e.g., 972-555-1234@CTEXI300); an IP address (e.g., 47.161.18.72); a SIP address (e.g., rsmith@nortelnetworks.com); or a SIP address at a specific IP address (e.g., rsmith@47.161.18.72). Identifiers according to other formats may be illustrated in the address field 208 in further embodiments.

A status field 212 may also be included in the screen 200, which may show the status as "not in call," "outgoing call to R. Smith," "incoming call from R. Smith," and so forth. A plurality of indicators 214 may also be provided in the screen 200. A C indicator flashes when an incoming call has been missed. An S indicator gives an indication that call screening is active. A P indicator gives an indication that a SIP proxy is in use or not in use. An E indicator gives an indication of the state of the associated network telephone. Thus, the E indicator is at a first state if the network telephone is not active and at a second state if the network telephone is active and available. The E indicator may also be at a third state to indicate that a call is currently in progress.

The screen 200 is also capable of providing a pop-up menu 210 to allow a user to select one or several methods of contacting the desired callee. For example, a first option in the pop-up menu 210 is to call R. Smith. Another option is to send an electronic mail to R. Smith. A third option is to go to R. Smith's web site.

Other call control operations that may be performed by a user through the screen 200 includes volume control, screening of incoming calls, termination of a call session, and other operations.

Figure 5:
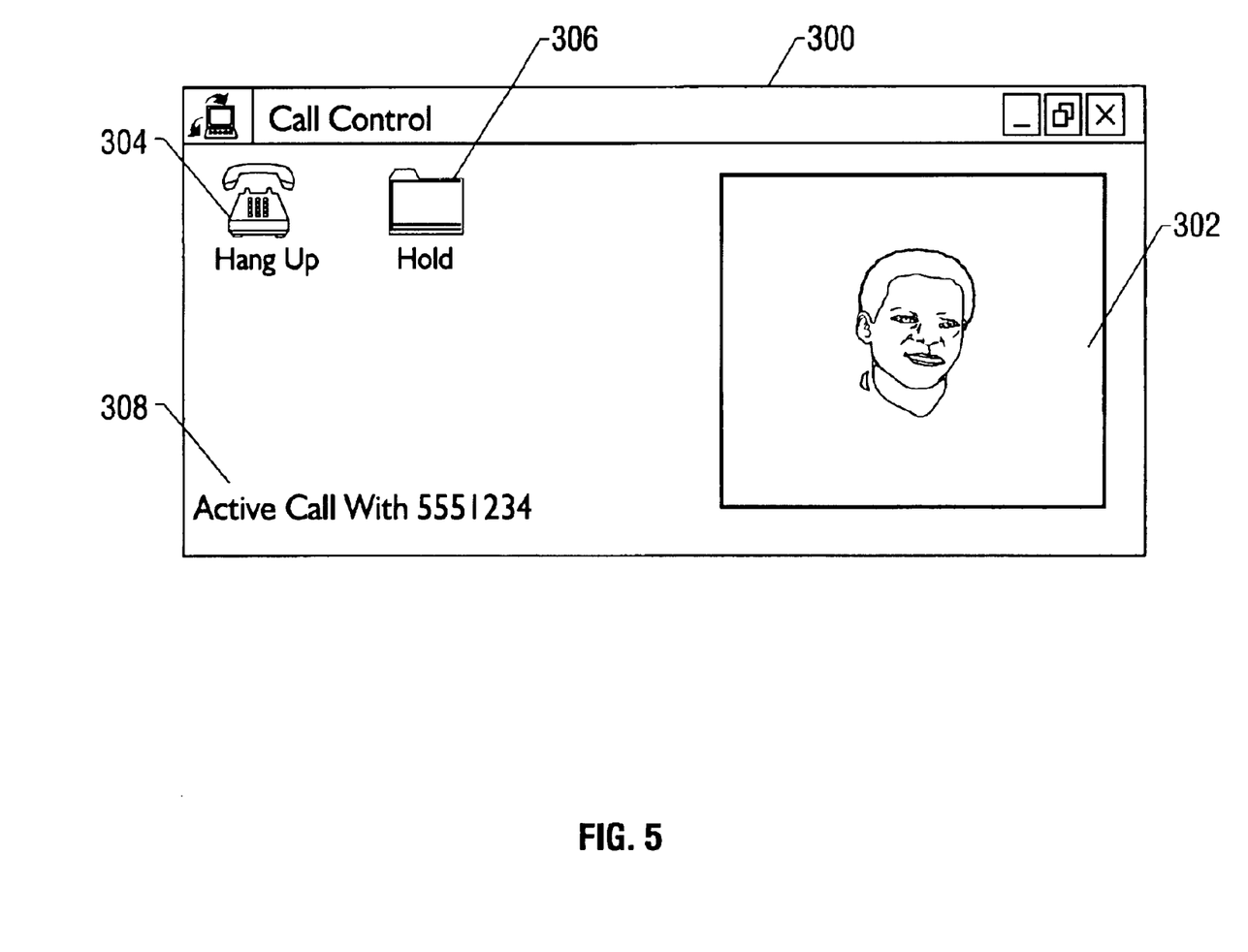

Referring to FIG. 5, once a call is established with either a caller or a callee, another screen 300 may be shown. A picture of the caller or callee may be displayed in the screen 300. An icon 304 may be provided to allow the user to hang-up the call, and another icon 306 may be provided to allow the call to be placed on hold. A status field 308 indicates the current status of the call.

Figure 6:
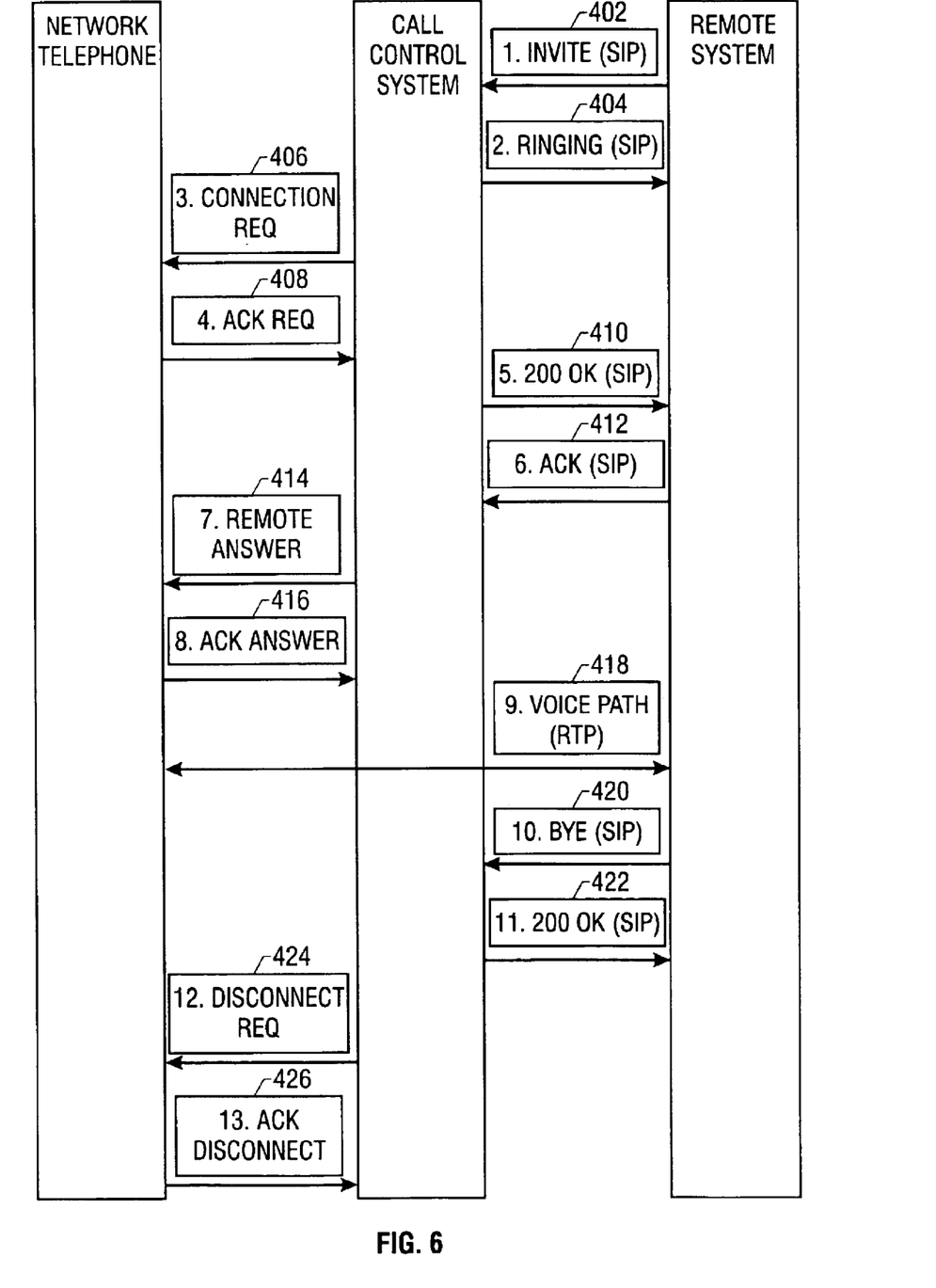
FIG. 6 is a message flow diagram of messages exchanged between network elements in the communications system of FIG. 1 for processing an incoming call.

Referring to FIG. 6, a message flow between a network telephone, a call control system, and a remote system is illustrated. According to SIP, messages that may be exchanged between network elements include requests and responses. The remote system may be another call control system, one of the SIP client systems 38 and 40, the data network-PSTN gateway 20, or any other system capable of establishing a call session on the data network 11. The remote system first sends (at 402) an Invite request (according to SIP) to the call control system. The Invite request indicates that the receiving node is being invited to participate in a session. The message body of the Invite request contains a description (e.g., in SDP format) of the session to which the receiving node is being invited.

The call control system may then send (at 404) a Ringing (SIP) response back to the remote system. The Ringing response indicates that the called user agent has located a possible location where the user has registered recently and is trying to alert the user. The call control system may then send (at 406) a Connection_Req message to the network telephone to initiate a connection between the call control system and the network telephone. The messaging format between the network telephone and the call control system may be any predetermined format that allows call establishment and control to be performed by the call control system with the network telephone. One such format is the Unified Networks IP Stimulus Protocol, Draft Version 2.1, dated Dec. 7, 1999. In further embodiments, other interface protocols may be employed. A description of one embodiment of a protocol for message exchange between the network telephone and the call control system is provided in U.S. patent application Ser. No. 09/307,356, entitled "Telephony and Data Network Services at a Telephone," filed on May 7, 1999, which is hereby incorporated by reference.

The Connection_Req message is a generic message which includes one or more commands that indicates a request to establish a connection. The Connection_Req message may actually include a ring command to activate the ringer of the network telephone and other commands to activate the network telephone, such as activation of the handset, headset, microphone, speaker, and so forth. The network telephone may then send back (at 408) an Ack_Req message to the call control system to acknowledge that the network telephone is available and ready. The Ack_Req message may also be a generic message to acknowledge receipt of the Connection_Req message. Upon receipt of Ack_Req message from the network telephone, the call control system sends (at 410) a 200 OK SIP response to the remote system to indicate that the request has succeeded. The remote system then sends (at 412) an Ack request (according to SIP) to the call control system. The Ack request confirms that the client has received a final response to an Invite request.

Upon receipt of Ack request, the call control system sends (at 414) a Remote_Answer message to the network telephone to indicate a request to establish a path for a call session. If accepted, the network telephone then sends (at 416) an Ack_Answer message back to the call control system. The Remote_Answer message may be a generic message that includes one or more commands to activate the network telephone for call session. One such command is a command to open or connect the audio stream to the handset, headset, microphone and speaker of the network telephone. At that point, a voice path is established (at 418) directly between the network telephone and the remote system. The voice path may be an RTP link over the data network 11.

To terminate the call, the remote system may issue (at 420) a Bye request to the call control system. The call control system then responds (at 422) with a 200 OK, indicating that the call has been terminated. Then, the call control system sends (at 424) a Disconnect_Req message to the network telephone to disconnect the network telephone from the data network. The Disconnect_Req message be a generic message including one or more commands to deactivate various components of the network telephone. For example, the audio stream may be closed or disconnected, and the handset, headset, microphone, and speaker may be deactivated. The network telephone then returns (at 426) an Ack_Disconnect message back to the call control system to indicate that the call has been disconnected.

Figure 7:
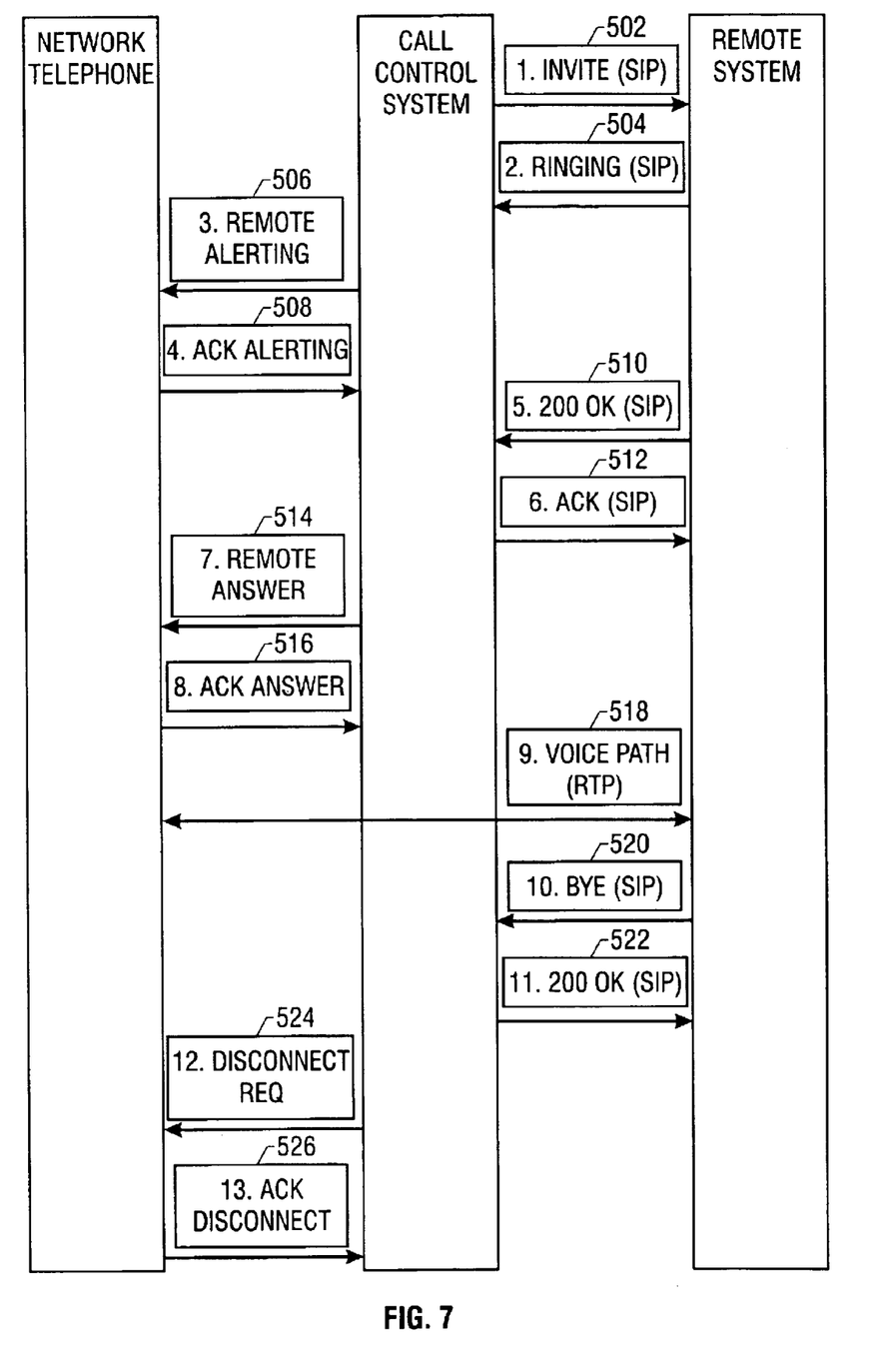
FIG. 7 is a message flow diagram of messages exchanged between network elements in the communications system of FIG. 1 for placing an outgoing call.

Referring to FIG. 7, an outgoing call message flow is illustrated. In the illustrated example, the user can initiate the call from the call control system. However, the user can also make the external call from the network telephone by entering the desired number in appropriate buttons of the network telephone. In that case, messages are exchanged between the network telephone and the call control system initially to indicate to the call control system that the user has started a phone call from the network telephone.

To start the call session, the call control system sends (at 502) an Invite request to the remote system. The remote system then sends back (at 504) a Ringing response. In response, the call control system sends (at 506) a Remote_Alerting message to the network telephone indicating that the call has been placed. The network telephone then returns (at 508) an Ack_Alerting message. At some point, the remote system, once it has answered the call, issues (at 510) a 200 OK message to the call control system. In response, the call control system then sends (at 512) an Ack request back to the remote system. The call control system also sends (at 514) a Remote_Answer message to the network telephone, which returns (at 516) an Ack_Answer message to the call control system. At that point, a voice path (e.g., an RTP path) is established (at 518) between the network telephone and the remote system over the data network 11.

To terminate the call, the remote system may issue (at 520) a Bye request. In response, the call control system may terminate the call by sending (at 522) a 200 OK message. The call control system then sends (at 524) a Disconnect_Req message to the network telephone, which returns (at 526) an Ack_Disconnect message to the call control system. At this point, the RTP voice path is terminated.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of communicating over a data network, comprising:
   providing a user interface in a control system for establishing call sessions;
   communicating, by the control system, one or more control messages over the data network to establish a call session with a remote device in response to receipt of a request through the user interface; and
   transmitting one or more commands to a voice device connected to the data network and associated with the control system to establish the call session between the voice device and the remote device over the data network.

2. The method of claim 1, wherein the communicated one or more control messages and the transmitted one or more commands are according to different formats.

3. The method of claim 1, wherein transmitting the one or more commands to the voice device includes transmitting one or more commands to a network telephone including a network interface to the data network.

4. The method of claim 1, wherein establishing the call session includes establishing a Real-Time Protocol session over the data network.

5. The method of claim 1, wherein communicating the one or more control messages includes communicating messages according to a protocol defining real-time, interactive call sessions over a packet-switched data network.

6. The method of claim 1, wherein communicating the one or more control messages includes communicating one or more Session Initiation Protocol messages.

7. The method of claim 1, further comprising storing, in the control system, an identifier of the voice device.

8. The method of claim 7, wherein storing the identifier includes storing an Internet Protocol address and a port of the voice device.

9. The method of claim 1, further comprising receiving an indication from the voice device to establish another call session with the remote device.

10. The method of claim 1, further comprising displaying graphical user interface information of the call session on the control system.

11. The method of claim 1, further comprising terminating the call session using either the user interface or the voice device.

12. A method of communicating over a data network, comprising:
    in a control system, communicating one or more control messages over the data network to establish a call session with a remote device coupled to the data network;
    transmitting one or more commands to a voice device coupled to the data network;
    establishing the call session between the voice device and the remote device over the data network; and
    displaying information associated with the call session on the control system.

13. The method of claim 12, wherein displaying the information includes displaying graphical user interface information.

14. The method of claim 12, wherein communicating the one or more control messages includes communicating Session Initiation Protocol messages.

15. The method of claim 12, further comprising providing one or more indicators for call control in the control system.

16. The method of claim 12, further comprising communicating Real-Time Protocol messages between the voice device and the remote device over the data network.

17. The method of claim 12, further comprising identifying, in the control system, an address of the voice device to be controlled by the control system.

18. The method of claim 12, further comprising providing a user interface on a display of the control system, the user interface enabling selection of one or more criteria associated with the voice device.

19. The method of claim 18, wherein the one or more criteria includes selection of the voice device for use in a voice session established by the control system.

20. The method of claim 19, wherein the one or more criteria includes an identifier of the voice device.

21. The method of claim 12, further comprising providing voice processing components in the control system and selecting one of the voice processing components and the voice device to communicate in the established call session.

22. The method of claim 21, further comprising receiving user selections entered in a user interface of the control system to select one of the voice processing components and the voice device.

23. The method of claim 21, further comprising redirecting selection to the other one of the voice processing components and voice device.

24. The method of claim 12, wherein the data network includes a packet-switched data network.

25. A system for controlling a voice device connected to a data network, comprising:
    a user interface including one or more selectors for call control relating to call sessions;
    a controller adapted to receive a request from the user interface and to generate one or more messages for communication over the data network to establish a call session with a remote device; and
    an interface to transmit one or more commands relating to the call session to the voice device to establish a link between the voice device and the remote device over the data network.

26. The system of claim 25, wherein the one or more messages include Session Initiation Protocol messages.

27. The system of claim 26, further comprising a module to process the one or more Session Initiation Protocol messages.

28. The system of claim 25, wherein the interface includes a network interface for coupling to the data network.

29. The system of claim 25, further comprising a storage element including an identifier of the voice device.

30. The system of claim 25, wherein the user interface includes one or more elements to display information relating to the call session.

31. The system of claim 30, wherein the information includes graphical information.

32. An article including one or more machine-readable storage media containing instructions for controlling voice communications over a data network, the instructions when executed causing a system to:
    provide a user interface in the system to display information associated with a call session;
    communicate one or more control messages over the data network with a remote device to establish the call session between a voice device and the remote device; and
    control the voice device during the call session.

33. The article of claim 32, wherein the one or more storage media contain instructions that when executed cause the system to communicate Session Initiation Protocol messages.

34. The article of claim 32, wherein the one or more storage media contain instructions that when executed cause the system to display a picture of a callee.

35. The article of claim 32, wherein the one or more storage media contain instructions that when executed cause the system to display icons selectable by a user for call control.

36. A data signal embodied in a carrier wave comprising one or more code segments containing instructions for controlling a call session over a data network, the instructions when executed causing a system to:
    provide a user interface in the system for establishing the call session;
    communicate one or more control messages over the data network to establish the call session with a remote device in response to a request received through the user interface; and transmit one or more commands to a voice device connected to the data network and associated with the control system to establish the call session between the voice device and the remote device over the data network.

37. The method of claim 1, further comprising receiving activation of an element in the user interface to indicate establishment of the call session between the voice device and the remote device.

38. The method of claim 13, further comprising receiving activation of one or more selectors in the graphical user interface information for initiating the call session between the voice device and the remote device.

39. The system of claim 25, wherein the user interface comprises a graphical user interface, and wherein the controller is adapted to receive activation of one or more selectors in the graphical user interface to establish the call session.

* * * * *